(12) United States Patent
Beer

(10) Patent No.: US 7,121,990 B2
(45) Date of Patent: Oct. 17, 2006

(54) ELASTOMERIC RUNNING WHEEL FOR PLATENS OR THE LIKE

(75) Inventor: Christian Beer, Dombirn (AT)

(73) Assignee: Heron Sondermaschinen und Steuerungen GmbH, Lustenau (AT)

( * ) Notice: Subject to any disclaimer, the term of this patent is extended or adjusted under 35 U.S.C. 154(b) by 807 days.

(21) Appl. No.: 10/352,274

(22) Filed: Jan. 27, 2003

(65) Prior Publication Data
US 2003/0114284 A1    Jun. 19, 2003

Related U.S. Application Data

(63) Continuation of application No. 09/527,740, filed on Mar. 17, 2000, now abandoned.

(30) Foreign Application Priority Data

Apr. 22, 1999 (DE) ............... 199 18 236

(51) Int. Cl.
  *F16C 13/00* (2006.01)
(52) U.S. Cl. ..................... 492/16; 400/661.1
(58) Field of Classification Search .......... 492/28, 492/47, 56, 59, 16; 384/418; 400/648, 659, 400/660.1, 662, 661.1
  See application file for complete search history.

(56) References Cited

U.S. PATENT DOCUMENTS

| | | | |
|---|---|---|---|
| 1,177,031 A | 3/1916 | Gruner | |
| 1,812,855 A | 7/1931 | Benner | |
| 2,028,280 A | 1/1936 | Handley | |
| 2,042,000 A | 5/1936 | Handley | |
| 2,858,927 A | 11/1958 | Metzner et al. | |
| 3,342,299 A | 9/1967 | Harmon et al. | |
| 3,613,316 A | 10/1971 | Eten | |
| 3,920,113 A | 11/1975 | Tamai | |
| 3,960,258 A | 6/1976 | Aebi | |
| 4,100,551 A | 7/1978 | King | |
| 5,957,261 A | 9/1999 | Inoue et al. | |
| 5,996,775 A | 12/1999 | Hendrickx | |

FOREIGN PATENT DOCUMENTS

| | | |
|---|---|---|
| DE | 76 04 277 | 9/1976 |
| DE | 3315766 | 4/1983 |
| DE | 3418240 | 5/1984 |
| DE | 94 12 094.3 | 11/1994 |
| EP | 0523711 | 1/1993 |
| JP | 1-221269 | 9/1989 |
| JP | 5-155079 | 6/1993 |

*Primary Examiner*—T. Nguyen
(74) *Attorney, Agent, or Firm*—Knobbe Martens Olson & Bear LLP

(57) ABSTRACT

The invention relates to an elastomeric running wheel for platens or the like, in which the connection between the axle and the running wheel is formed as an elastomerically deformable membrane, and the elastomeric running wheel is made in one piece from a plastic material (polypropylene or polyurethane) which may have different mechanical hardnesses.

16 Claims, 4 Drawing Sheets

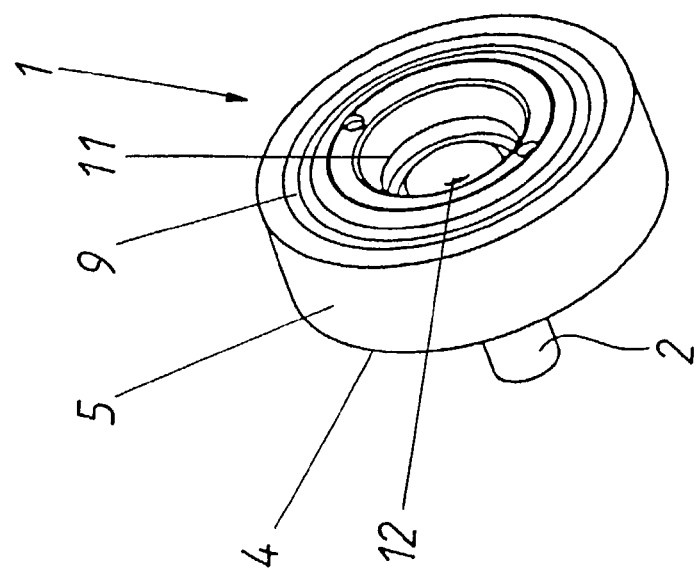
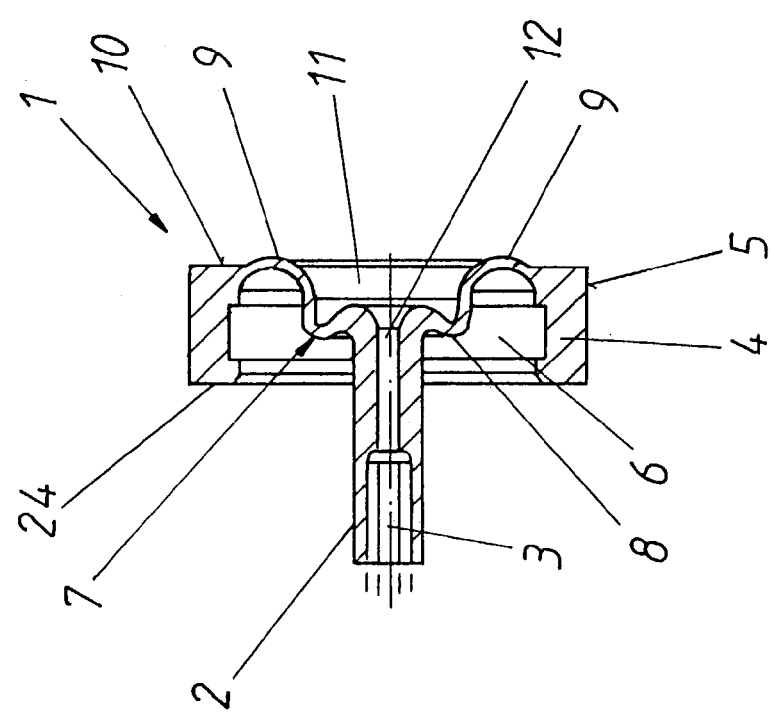
FIG. 2
FIG. 1

ELASTOMERIC RUNNING WHEEL FOR PLATENS OR THE LIKE

RELATED APPLICATION

This application is a continuation of application Ser. No. 09/527,740, filed on Mar. 17, 2000 now abandoned.

BACKGROUND OF THE INVENTION

1. Field of the Invention

The subject matter of the invention is an elastomeric running wheel for platens or the like 2. Description of the Related Technology The subject matter of EP 0601581 B1 discloses a fax arrangement with running wheels in which an elastomeric disc is provided as a shock-absorbing element which sustains and cushions axle shocks to the running wheel arrangement. With this known arrangement, however, it is not possible for axle shocks to be sustained directly in the running wheel itself, nor is it possible for each running wheel to be made independently steerable and deflectable on the axle, as the axle in the known arrangement is a rigid axle which rigidly connects the running wheels to each other.

Platens which run on rails need to be able to negotiate curves in the track. Hitherto this has been possible only by means of rigid, steerable axles.

However, such rigid, steerable axles have the drawback that relatively high bearing forces, with corresponding friction, ensue. The resulting friction is so high that their drive motor, which is usually powered by battery or by some other form of stored electricity, can run for only a short time.

Hence there is a desire to depart from the principle of the steerable rigid axle and to substitute individually steered running wheels, which are less subject to bearing-friction.

A further drawback of guiding rigid driving wheels with a rigid drive axle on curved rails is that the wheel on the outside of the curve has to rotate faster than the wheel on the inside of the curve. Weight considerations argue against the adoption of a differential to eliminate this drawback. In the absence of a differential, the disadvantage will have to be accepted of having a single driving wheel running on one running surface only.

Therefore the problem which lies at the basis of the invention is to develop a general type of running wheel for a platen running on any kind of guide services so as to reduce the friction forces, especially when negotiating curves, to ensure that the drive motor driving the platen has a longer running time for a given power supply.

SUMMARY OF CERTAIN INVENTIVE ASPECTS

For the solution of the stated problem, the invention is characterized in that the connection between the axle and the running wheel is formed as an elastomerically deformable membrane.

The technical teaching yields the considerable advantage that the running wheel is made elastomerically deformable with respect to an axle stub to which it is joined. In other words, the connection between axle stub and running wheel is not rigid, but is made in the region of an elastomerically deformable membrane region which allows buckling and flexing so that the axle stub joined to the running wheel can be at an angle to the running direction of the running wheel.

The running wheel is steerably, that is bendily and slewably, joined to the axle stub by an elastomerically deformable membrane region.

The present invention is not confined to driven running wheels whose axle stub is connected to a driving shaft and which are steerable by virtue of the elastomerically deformable membrane region, but also relates to passive running wheels which are able to rotate freely and accordingly run e.g. in grooves in a guidance system and are steerably guided therein.

The invention is equally applicable where the running wheel runs on flat guide surfaces without lateral guidance and where the running wheel is additionally made self-steering through laterally acting guide surfaces and flanges.

The all-important feature is that the axle stub is joined to the running wheel in the manner of an angular compensation coupling.

This yields the advantage that the running wheel is arranged on the axle stub in an easily steerable manner, and friction forces are low because each running wheel is steerably mounted on its respective axle stub, and a rigid axle joining two opposite running wheels together can be dispensed with.

In a preferred configuration of the present invention, the elastomeric running wheel is made in one piece from a plastic material, e.g. from a polypropylene or an elastomeric plastic material. The plastic material may also be a polyurethane material, in which case different hardnesses can be selected. That is to say, a harder polyurethane material can be adopted for the roller body than for the membrane to which the roller body is integrally joined and which sustains the flexing movements and is in turn integrally joined to the axle stub.

The subject matter of the present invention follows not only from the individual claims considered separately, but also from the individual claims considered in combination.

All details and features disclosed in the documents, including the Abstract, and in particular the configuration illustrated in the drawings, are claimed as essential to the invention in so far as, considered separately or in combination, they are novel in relation to the state of the art.

BRIEF DESCRIPTION OF THE DRAWINGS

The invention will now be described in detail with reference to drawings showing a number of ways of carrying it out. Further features essential to the invention and advantages of the invention will become apparent from the drawings and the description.

FIG. 1 is a section through a running wheel according to the invention;

FIG. 2 is a perspective view, in elevation, of the running wheel of FIG. 1;

DETAILED DESCRIPTION OF CERTAIN INVENTIVE EMBODIMENTS

Figure 4:
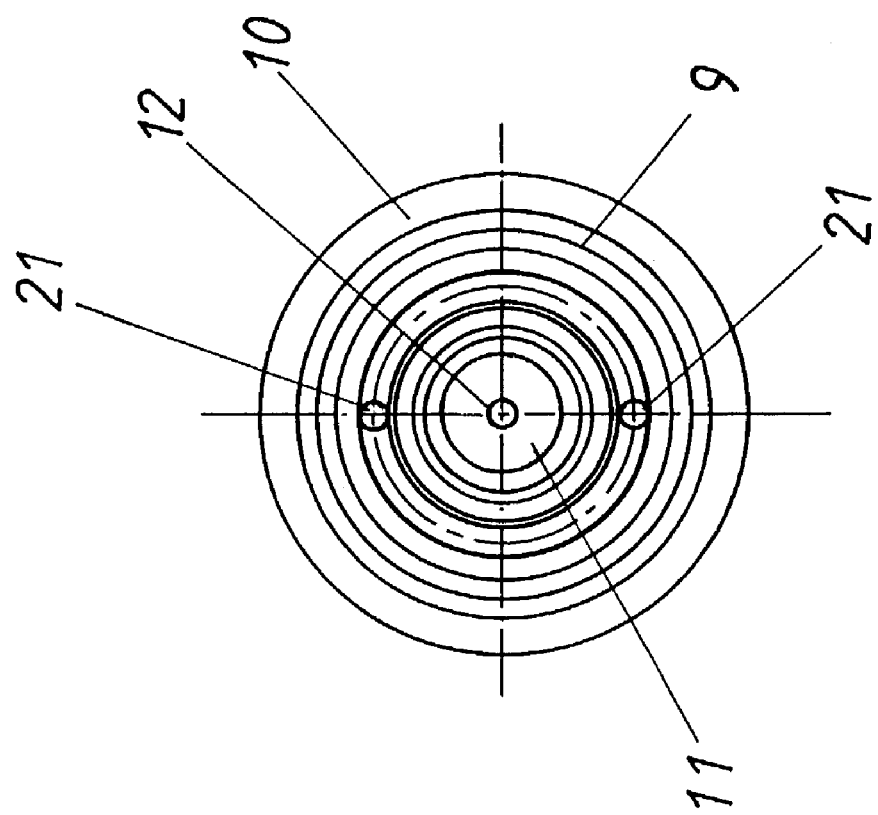
FIG. 4 is a top view of the running wheel of FIG. 1.

The running wheel 1 shown in FIGS. 1–4 wholly consists of a body made of elastomeric plastic material which essentially comprises an axle stub 2 with a seat 3 of specific depth at its rear end for fitting on to a drive axle. This running wheel 1 according to FIGS. 1–4 is, therefore, driven. The axle stub 2 is integrally connected by an elastomerically deformable region to the outer end face (outer face 10) of the running wheel 1. Specifically, the front end of the axle stub 2 is joined by a bridging bellows 8 to a membrane region 9 which in turn is integrally joined to the outer face 10 of the running wheel 1.

Taken as a whole, therefore, the membrane region 9 has both a concave, outwards-directed cross-section and a convex, inwards-directed cross-section, and these two cross-sections (concave-convex) alternate, thus giving the membrane region 9 as a whole particularly good flexibility and adaptability.

The invention is of course not limited to the simple juxtaposition of one concave deformation zone and one convex deformation zone within the membrane region 9; further alternately concave and convex deformation zones like those in FIG. 1 may be added.

Taken as a whole, therefore, the connecting wall 7 thereby formed between the axle stub 2 and the outer face 10 of the running wheel 1 is elastomerically deformable.

However, the invention is not limited to a configuration in which an elastomerically deformable connecting wall 7 is joined to the outer face 10 of the running wheel 1. In another configuration, this elastomeric connecting wall 7 is joined to the inner face 24 of the running wheel 1.

The roller body 4 of the running wheel 1 is essentially formed as a cylindrical cross-section with a running face 5, which may be either plane or profiled, formed on its exterior.

If the running face 5 is profiled, it would run on, and engage in, corresponding projections of a profiled guide surface 22.

Owing to the fact that the connecting wall 7 is connected to the outer face 10 of the running wheel 1, an inner recess 6 is formed, in which the deformation play of the connecting wall 7 takes place.

Viewed in the axially outward direction, a recess 11 open to the exterior is thereby formed outside the connecting wall 7. This recess contains an opening 12 axially aligned with the longitudinal axis of the axle stub 2.

The opening 12 in the axle stub 2 has no function; its purpose is to save material.

Figure 3:
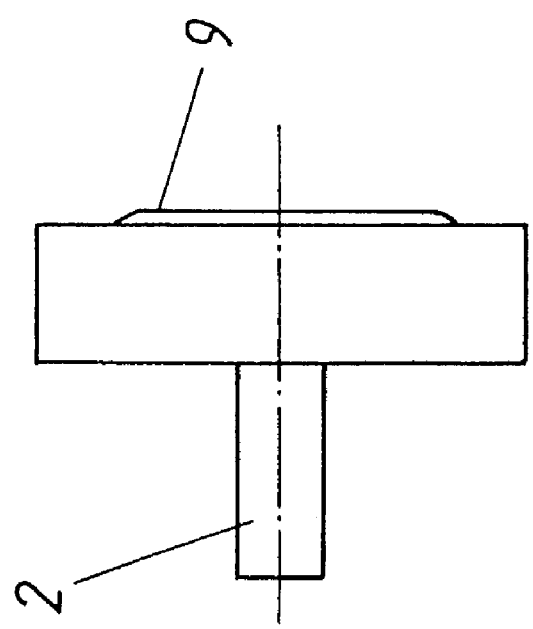
FIG. 3 shows the running wheel of FIG. 1 in elevation.

FIGS. 2 to 4 show the same parts in other views. Therefore, the description of FIG. 1 refers.

Figure 5:
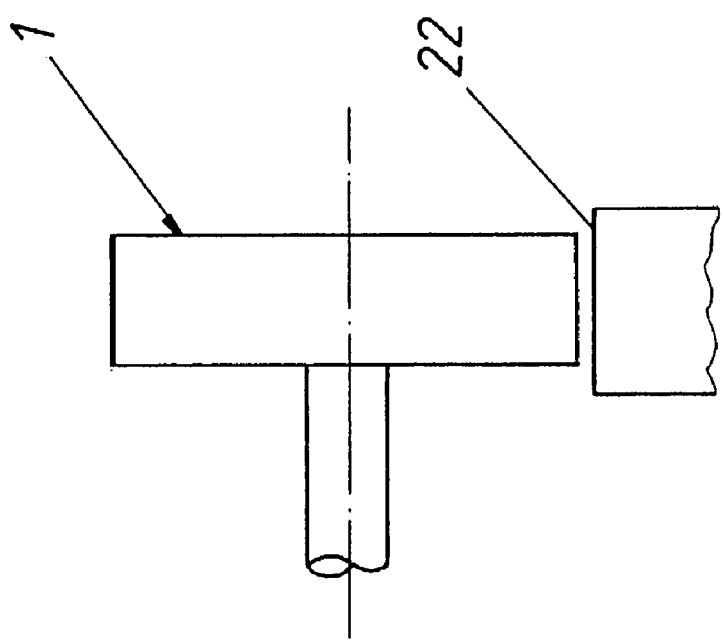
FIG. 5 shows the running wheel on a flat guide surface.

FIG. 5 shows that the driven running wheel 1 may run on a flat guide surface 22 of a track.

Figure 6:
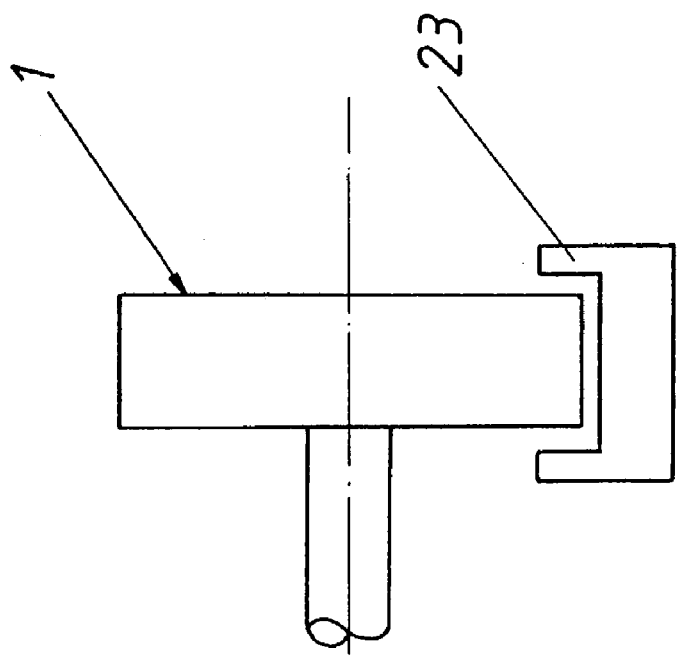
FIG. 6 shows the running wheel on a profiled guide surface.

By contrast, FIG. 6 shows that the running wheel 1 may also run on a profiled guide surface, namely a profiled surface 23 of the track, and be laterally guided by lateral profile cross-sections.

Figure 7:
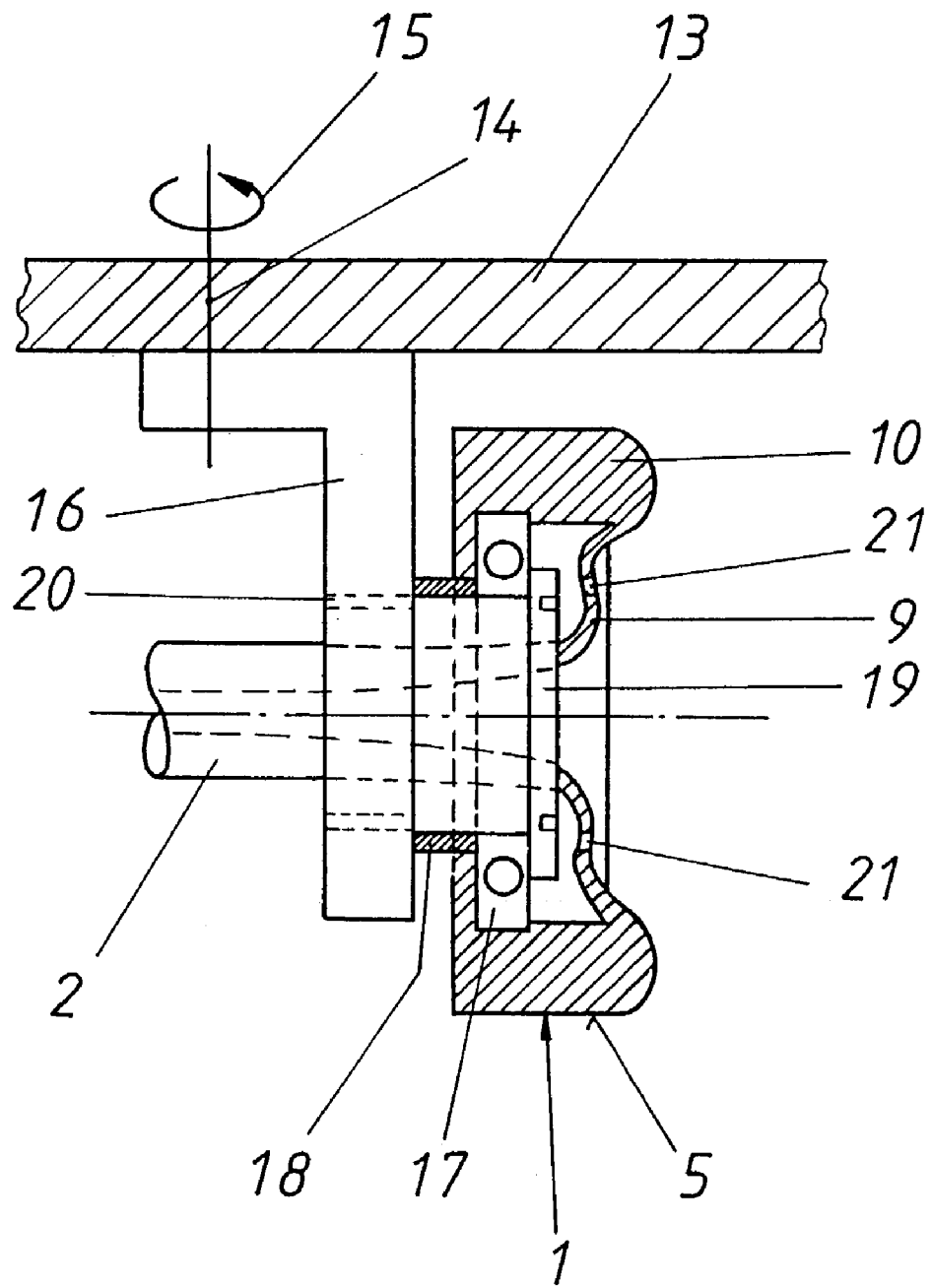
FIG. 7 shows an embodiment of a non-driven running wheel which is a modified form of the running wheel of FIGS. 1 to 4.

FIG. 7 shows that a non-driven running wheel 1 can be used instead of a drive running wheel, so in this case the axle stub 2 is not connected to a drive shaft. It merely lodges in a steerable bearing bracket 16 arranged pivotably about a steering axis 14 in the direction of the arrow 15 on a platen tray 13.

The running wheel 1 is attached to the bearing bracket 16 by means of a screw 19 whose head rests on the inside of the running wheel 1 and which grips one side of a ball bearing 17 fitted in the recess 6 of the running wheel 1. The ball bearing 17 is supported axially inwards on a distance sleeve 18 the axial end face of which bears in turn on the bearing bracket 16. In this way, the inner raceway of the ball bearing 17 is fixed to the bearing bracket 16 by means of the fixing screw 19.

To give access to the fixing screw 19, holes 21 are provided in the connecting wall 27 in order that, with the running wheel at rest, turning pockets in the fixing screw 19 can be accessed via these holes with a suitable tool, and the fixing screw 19 can then be screwed home.

DRAWING LEGEND

1. Running wheel
2. Axle stub
3. Seat
4. Roller body
5. Running faces
6. Recess
7. Connecting wall
8. Bellows
9. Membrane region
10. Outer face
11. Recess
12. Opening
13. Platen
14. Steering axis
15. Arrow direction
16. Bearing bracket
17. Ball bearing
18. Distance sleeve
19. Fixing screw
20. End of screw
21. Hole
22. Guide surface
23. Profiled surface
24. Inner face

What is claimed is:

1. A running wheel apparatus, comprising:
a bearing bracket, configured to mount to a platen and to pivot about an axis of rotation;
a running wheel, configured to mount to the bearing bracket, comprising:
a wheel body having an outer face, an inner face, a running surface, and an axis or rotation, and wherein the axis of rotation of the wheel body is substantially perpendicular to the axis of rotation of the bearing bracket;
an axle stub, configured to connect the running wheel to the bearing bracket;
an elastomerically deformable membrane region integrally connecting the axle stub and the outer face of the wheel body, wherein the elastomerically deformable membrane region allows buckling and flexing to adjust to angular changes between the axle stub and the running wheel;
a distance sleeve, coupled between the bearing bracket and the wheel body, wherein the axle stub passes through the distance sleeve;
a bearing, supported by the distance sleeve and located in a cavity of the running wheel formed by the wheel body and the elastomerically deformable membrane; and
a fixing element configured to secure the bearing to the distance sleeve.

2. The running wheel apparatus of claim 1, wherein the elastomerically deformable membrane includes a bellow-shaped portion coupled to the axle stub.

3. The running wheel apparatus of claim 1, wherein the elastomerically deformable membrane has a convex section with a first end proximal to the outer face of the wheel body and a second end proximal to the axle stub.

4. The running wheel apparatus of claim 3, wherein the elastomerically deformable membrane is integrally joined to the wheel body.

5. The running wheel apparatus of claim 3, wherein the elastomerically deformable membrane is integrally joined to an inner surface of the wheel body proximal to the outer face, wherein the inner surface of the wheel body is opposite the running surface of the wheel body.

6. The running wheel apparatus of claim 5, wherein the elastomerically deformable membrane is integrally joined to the axle stub.

7. The running wheel apparatus of claim 2, wherein the bellow-shaped portion of the elastomerically deformable membrane merges into the axle stub.

8. The running wheel apparatus of claim 7, wherein the elastomerically deformable membrane has a substantially funnel-like shape.

9. The running wheel apparatus of claim 1, wherein the bearing has an inner diameter sized to allow placing the ball bearing over the axle stub and a neck portion of the funnel-like shape of the elastomerically deformable membrane, and an outer diameter sized to match an inner diameter of the wheel body, and wherein the bearing is configured to connect to a carrier and to support the wheel body.

10. The running wheel apparatus of claim 3, wherein the elastomerically deformable membrane has a concave section coupled between the convex section and the axle stub.

11. The running wheel apparatus of claim 1, wherein the axle stub has a seat to receive an end of the axle, and wherein the seat has a predetermined depth.

12. The running wheel apparatus of claim 1, wherein the wheel body has a substantially cylindrical cross-section.

13. The running wheel apparatus of claim 1, wherein the wheel body has a running face that is profiled.

14. The running wheel apparatus of claim 1, wherein the running wheel is made in one piece from a plastic material.

15. The running wheel apparatus of claim 14, wherein the plastic material is polypropylene or polyurethane.

16. The running wheel apparatus of claim 14, wherein the wheel body is formed from a plastic material which provides for a predefined hardness, and wherein the elastomerically deformable membrane is formed from a plastic material which provides for a hardness that is lower than the predetermined hardness of the wheel body.

* * * * *